(12) United States Patent
Patrick et al.

(10) Patent No.: US 10,647,235 B2
(45) Date of Patent: May 12, 2020

(54) ADJUSTABLE SEAT ASSEMBLY WITH DRIVING MODES

(71) Applicant: Lear Corporation, Southfield, MI (US)

(72) Inventors: Gerald Patrick, Shelby Township, MI (US); Samuel Hanlon, Livonia, MI (US); Michelle A. Pereny, Farmington Hills, MI (US); Marie-Eve Cote, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 276 days.

(21) Appl. No.: 15/724,708

(22) Filed: Oct. 4, 2017

(65) Prior Publication Data

US 2018/0022246 A1 Jan. 25, 2018

(51) Int. Cl.
*B60N 2/90* (2018.01)
*B60N 2/02* (2006.01)
*B60N 2/66* (2006.01)
*B60N 2/00* (2006.01)

(52) U.S. Cl.
CPC ............. *B60N 2/914* (2018.02); *B60N 2/002* (2013.01); *B60N 2/0232* (2013.01); *B60N 2/0248* (2013.01); *B60N 2/0252* (2013.01); *B60N 2/665* (2015.04); *B60N 2002/0268* (2013.01)

(58) Field of Classification Search
None
See application file for complete search history.

(56) References Cited

U.S. PATENT DOCUMENTS

| 5,263,765 | A | * | 11/1993 | Nagashima | A47C 7/467 297/284.6 |
|---|---|---|---|---|---|
| 6,198,996 | B1 | | 3/2001 | Berstis | |
| 8,958,955 | B2 | | 2/2015 | Hotary et al. | |
| 9,428,082 | B2 | | 8/2016 | Hotary et al. | |
| 9,845,026 | B2 | | 12/2017 | Pereny et al. | |
| 2009/0284059 | A1 | * | 11/2009 | Gupta | B60N 2/0224 297/284.9 |
| 2012/0053794 | A1 | * | 3/2012 | Alcazar | B60N 2/0244 701/48 |
| 2012/0086249 | A1 | * | 4/2012 | Hotary | B60N 2/809 297/284.3 |

(Continued)

OTHER PUBLICATIONS

U.S. Appl. No. 15/724,025, entitled "Adjustable Seat Assembly", filed Oct. 3, 2017, 28 pages.

*Primary Examiner* — Jonathan M Dager
*Assistant Examiner* — Garrett F Evans
(74) *Attorney, Agent, or Firm* — Brooks Kushman P.C.

(57) ABSTRACT

A seat assembly is provided with a seat cushion and a seat back. A controller is in electrical communication with an actuator. The controller is programmed to receive a data input indicative of occupant anthropometry data. The data input is compared with predetermined data ranges. A setting of the actuator is adjusted to a predetermined setting based on the predetermined data range. A data input indicative of a selected driving mode is received by the controller. The setting of the actuator is adjusted to another predetermined setting based on the selected driving mode. The actuator includes an inflation device, side bolster air bladders, a seat back recline actuator, a tilt actuator, and a central air bladder. The driving modes include a touring mode, a sport mode and a performance mode.

20 Claims, 5 Drawing Sheets

(56) References Cited

U.S. PATENT DOCUMENTS

| | | | |
|---|---|---|---|
| 2014/0361590 A1* | 12/2014 | Line | B60N 2/0244 |
| | | | 297/284.9 |
| 2015/0351692 A1 | 12/2015 | Pereny et al. | |
| 2015/0352979 A1 | 12/2015 | O'Bannon et al. | |
| 2015/0352990 A1 | 12/2015 | Zouzal et al. | |
| 2016/0159251 A1* | 6/2016 | Ebina | B60N 2/0244 |
| | | | 701/49 |
| 2016/0339802 A1 | 11/2016 | Hanlon et al. | |
| 2017/0361746 A1 | 12/2017 | Zouzal et al. | |
| 2019/0217796 A1* | 7/2019 | Takamatsu | B60N 2/002 |

* cited by examiner

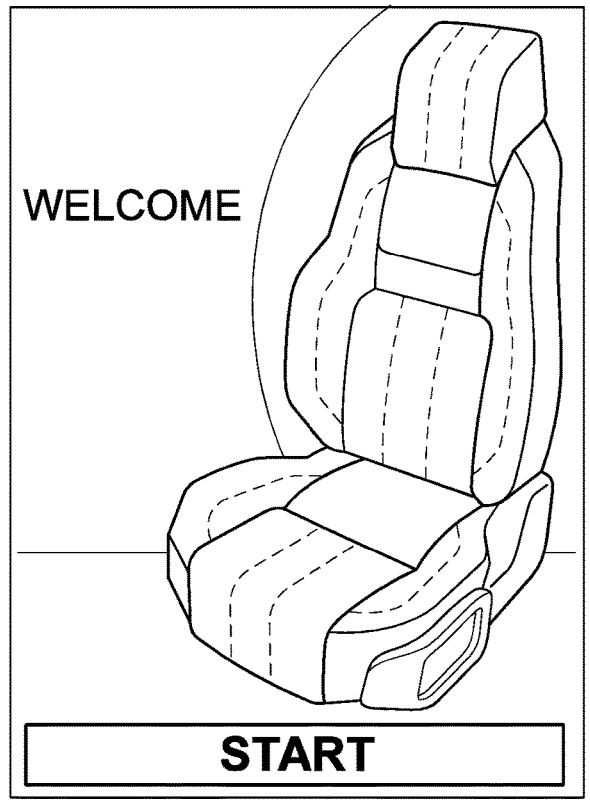

FIG. 3

QUESTIONNAIRE  *REQUIRED FIELD

| Your Name | |
| --- | --- |
| Gender | ■ Male  ☐ Female |
| Height (ft,in) * | 5' 6" ▼ |

Do you now, or have you in the past, experienced problems or issues in:

| Neck | ☐ Now | ☐ In the past |
| --- | --- | --- |
| Upper Back | ☐ Now | ☐ In the past |
| Mid Back | ☐ Now | ☐ In the past |
| Lower Back | ☐ Now | ☐ In the past |
| How often do you drive your primary vehicle? | Often, 4 to 6 days per... ▼ | |

CANCEL    CONTINUE

FIG. 4

QUESTIONNAIRE  *REQUIRED FIELD

| Upper Back | ☐ Now | ☐ In the past |
| --- | --- | --- |
| Mid Back | ☐ Now | ☐ In the past |
| Lower Back | ☐ Now | ☐ In the past |
| How often do you drive your primary vehicle? | Often, 4 to 6 days per... ▼ | |

Below is a list of paired statements describing preferences for Seating in a vehicle. For each statement check the box that best describes you attitude or preference:

| Soft Seat | ☐☐■☐☐ | Firm Seat |
| --- | --- | --- |
| Sitting reclined | ☐☐■☐☐ | Sitting upright |
| Loose fit around legs | ☐☐■☐☐ | Snug fit around legs |
| Loose fit on back | ☐☐■☐☐ | Snug fit on back |

CANCEL    CONTINUE

FIG. 5

ADJUSTABLE SEAT ASSEMBLY WITH DRIVING MODES

CROSS-REFERENCE TO RELATED APPLICATIONS

Technical Field

Various embodiments relate to adjustable seat assemblies with driving modes.

Background

An adjustable seat assembly is illustrated and described in U.S. Pat. No. 5,758,924, which issued on Jun. 2, 1998 to Lear Corporation.

SUMMARY

According to an embodiment, a seat assembly is provided with a seat cushion adapted to be adjustably mounted to a vehicle body. A seat back is pivotally mounted adjacent the seat cushion. At least one actuator is operably connected to at least one of the seat cushion and the seat back for adjustment of at least one of a plurality of settings of the seat assembly. A controller is in electrical communication with the at least one actuator. The controller is programmed to receive a data input indicative of occupant anthropometry data. The data input is compared with predetermined data ranges. At least one of the plurality of settings of the at least one actuator is adjusted to a predetermined setting based on the predetermined data range. A data input indicative of a selected driving mode is received by the controller. At least one of the plurality of settings of the at least one actuator is adjusted to another predetermined setting based on the selected driving mode.

According to another embodiment, a seat assembly is provided with a seat cushion adapted to be mounted to a vehicle body and an inflation device. A pair of side bolster air bladders is in fluid communication with the inflation device and is oriented within side bolster regions of the seat cushion, each with a range of inflation. A seat back is pivotally mounted adjacent the seat cushion with a pivot range. A seat back recline actuator is operably connected to the seat cushion and the seat back to adjust a recline angle of the seat back relative to the seat cushion. A pair of side bolster air bladders is in fluid communication with the inflation device and is oriented within side bolster regions of the seat back. A controller is in electrical communication with the inflation device and the seat back recline actuator. The controller is programmed to receive a data input indicative of a sport driving mode. The inflation device is adjusted to inflate the pair of side bolster air bladders in the seat cushion to increase bolster support in response to the sport driving mode. The inflation device is adjusted to inflate the pair of side bolster air bladders in the seat back to increase bolster support in response to the sport driving mode. The seat back recline actuator is adjusted to decrease an angle between the seat cushion and the seat back in response to the sport driving mode to increase back support.

According to another embodiment, a seat assembly is provided with a seat cushion adapted to be pivotally mounted to a vehicle body with a pivotal range of adjustment of a tilt angle of the seat cushion and an inflation device. A pair of side bolster air bladders is in fluid communication with the inflation device and is oriented within side bolster regions of the seat cushion, each with a range of inflation. A tilt actuator is operably connected to the seat cushion to pivot the seat cushion. A seat back is pivotally mounted adjacent the seat cushion with a pivot range. A seat back recline actuator is operably connected to the seat cushion and the seat back to adjust a recline angle of the seat back relative to the seat cushion. A pair of side bolster air bladders is in fluid communication with the inflation device and is oriented within side bolster regions of the seat back. At least one air bladder is oriented centrally within the seat back in fluid communication with the inflation device. A controller is in electrical communication with the inflation device, the seat back recline actuator, and the tilt actuator. The controller is programmed to receive a data input indicative of a performance driving mode. The inflation device is adjusted to inflate the pair of side bolster air bladders in the seat cushion to increase bolster support in response to the performance driving mode. The inflation device is adjusted to inflate the pair of side bolster air bladders in the seat back to increase bolster support in response to the performance driving mode. The seat back recline actuator is adjusted to decrease an angle between the seat cushion and the seat back in response to the performance driving mode to increase back support. The tilt actuator is adjusted to raise a front of the seat cushion in response to the performance driving mode to increase thigh support. The inflation device is adjusted to deflate the at least one central back air bladder in response to the performance driving mode to decrease central back support.

BRIEF DESCRIPTION OF THE DRAWINGS

FIG. 3 is a display image for a vehicle seating system according to an embodiment;

FIG. 4 is another display image for the vehicle seating system of FIG. 3;

FIG. 5 is another display image for the vehicle seating system of FIG. 3;

DETAILED DESCRIPTION

Figure 1:
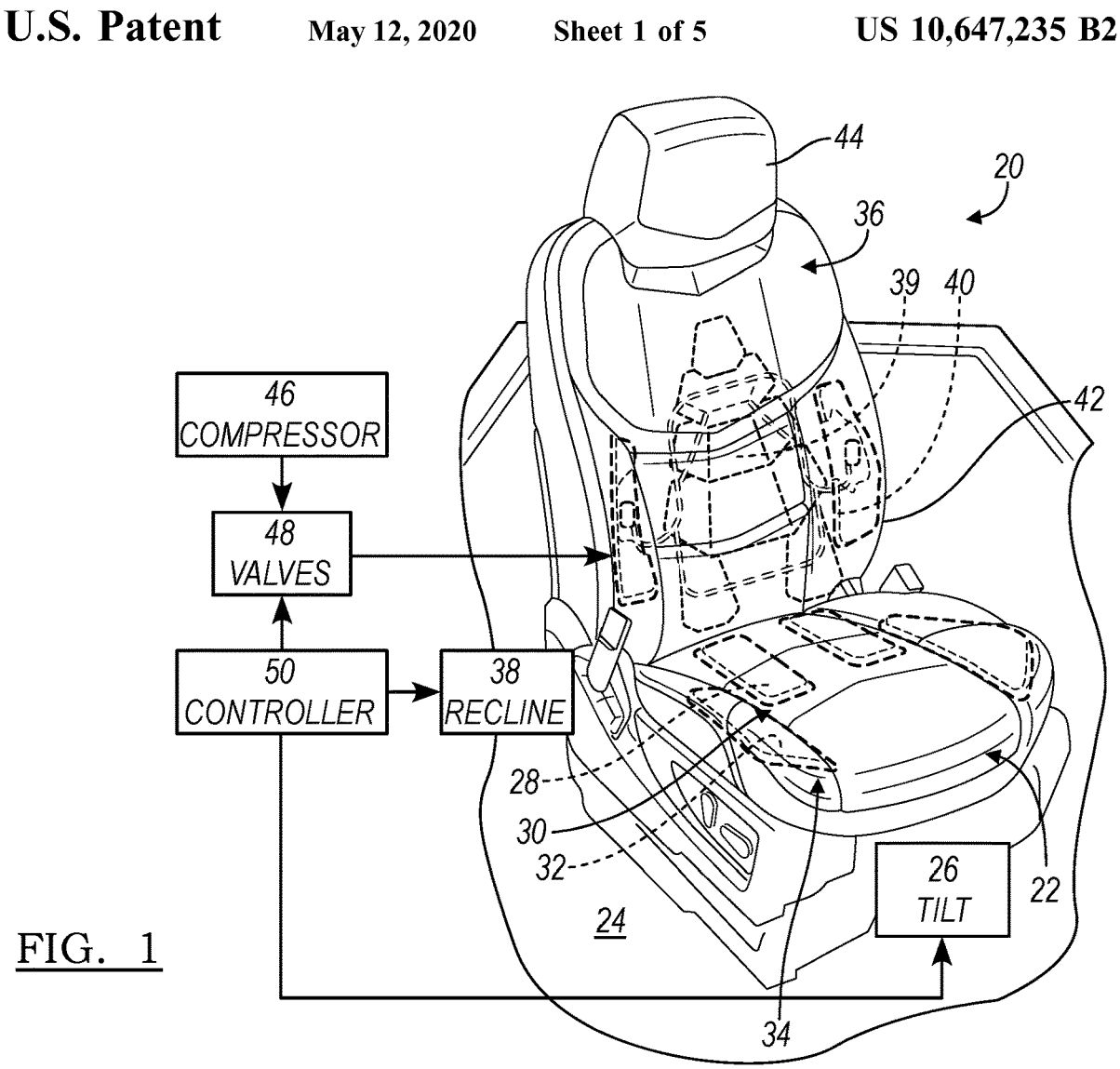
FIG. 1 is a front perspective view of a vehicle seat assembly, according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A comfort, posture and wellness seating system for vehicle seat assemblies, provides a visual interface with adjustment hardware organically or inorganically. The system may be employed to properly configure any new or existing seating system. The system can also address specific comfort, posture or preferences, such as thoracic support. The seating system objectifies comfort data and biomechanical knowledge to make the data transferable.

The comfort, posture and wellness seating system integrates anthropometry, bio-mechanics, and historical seating comfort data. The seating system can be employed in original equipment for vehicles or in aftermarket products. Applicable markets include automotive, mass transit, airlines, etc., as well as non-vehicular seating such as office, home, commercial, and public venue seating.

Data collection may be conducted that includes expert positioning of a suitable sample of occupants for optimal comfort or preferred posture by a medical professional. The data collection can be used at specific sites on an ongoing basis if required. The expert input provides a high level of expert comfort, posture and personalized fitting. The data may be based on anthropometry, body pressure distribution (BPD), status of actuators (such as pressure of inflatable air bladders, status of valves or the like), or other data that provides a comfort, posture and biomechanically optimized position of an adjustable vehicle seat assembly. The data is collected in a knowledge base or table for setting adjustments based on categories of data. The knowledge base may be compiled from the expert positioned data and the occupant specific data. The setting adjustments from the knowledge base are utilized for pre-set options in a vehicle seat assembly 20. The setting adjustments can be customized by a user at a controller or display.

Input data can be plotted versus adjustment settings for high level categorization. The settings can be categorized by topology clustering for setting the pre-set options. Various setting options may be provided for various types of driving. For example, a touring setting may provide per package settings and basic comfort, posture and wellness recommendations. The touring setting may also provide optimal visibility, use of features and controls, and the like. A sport setting may be provided for active drivers to provide a more erect position with firmer seating. A performance setting may be provided for active drivers in a performance setting to provide an erect position with even firmer seating.

FIG. 1 illustrates the vehicle seat assembly 20 while revealing internal components. The seat assembly 20 includes a seat cushion 22 adapted to be mounted to a floor 24 of a vehicle body. The seat cushion 22 is mounted to the vehicle floor 24 for adjustable tilt about a lateral axis within a limited pivotal range to raise a lower a front of the seat cushion 22. An actuator 26, such as a motor-driven actuator 26 is provided beneath the seat cushion 22 to adjust an angle of the seat cushion 22 relative to the vehicle floor 24 to regulate thigh support. Tilt actuators 26 are known in the art, and the tilt actuator 26 is illustrated schematically in FIG. 1. The seat assembly 20 may also include additional motor-driven actuators for translation in a fore and aft direction and in an up and down direction of the vehicle.

The seat cushion 22 includes a pair of central inflatable air bladder assemblies 28 spaced apart in a sacral region 30 of the seat cushion 22. The seat cushion 22 also includes a pair of bolster air bladder assemblies 32, each oriented within one of a pair of side bolster regions 34 of the seat cushion 22.

The seat assembly 20 includes a seat back 36 pivotally connected to the seat cushion 22 to extend generally upright relative to the seat cushion 22 with a limited range of pivotal movement. Motor-driven pivotal adjustment of the seat back 36 relative to the seat cushion 22 is provided by a seat back recline actuator 38. Recline actuators 38 are also known in the art, and the recline actuator 38 is also illustrated schematically in FIG. 1.

A central air bladder assembly 39 is provided in the seat back 36 within pelvis, lumbar and thoracic regions of the seat back 36. A pair of side bolster air bladder assemblies 40 are each provided within one of a pair of seat back side bolster regions 42. A head restraint 44 is mounted for motor-driven adjustable translation to the seat back 36.

At least one compressor 46 provides a source of air to the seat assembly 20. A plurality of valves 48 receive the compressed air and are controlled by a controller 50 for regulating compressed air into and out of the seat assembly 20. The valves 48 may be provided as a common valve bank that is housed in the seat back 36 or under the seat cushion 22; or the valves 48 may each be provided on each of the air bladders 28, 32, 39, 42. The compressor 46 may be provided in the seat back 36, the seat cushion 22 or concealed within the vehicle body. The controller 50 may be provided in a module under the seat cushion 22, and may be a multifunction controller that also controls other functions in the vehicle.

It is believed that supporting the thoracic region of the spine can reduce forces and support as much as one-third of the upper body mass. By increasing support of the upper body mass, loads are reduced on the muscles, ligaments, and spine and pelvic regions. Decreased load reduces fatigue on these areas of the body. The individual air bladders of the central air bladder assembly 39 are adjustable to provide the right degree of support in the correct location necessary to reduce such loading.

Figure 2:
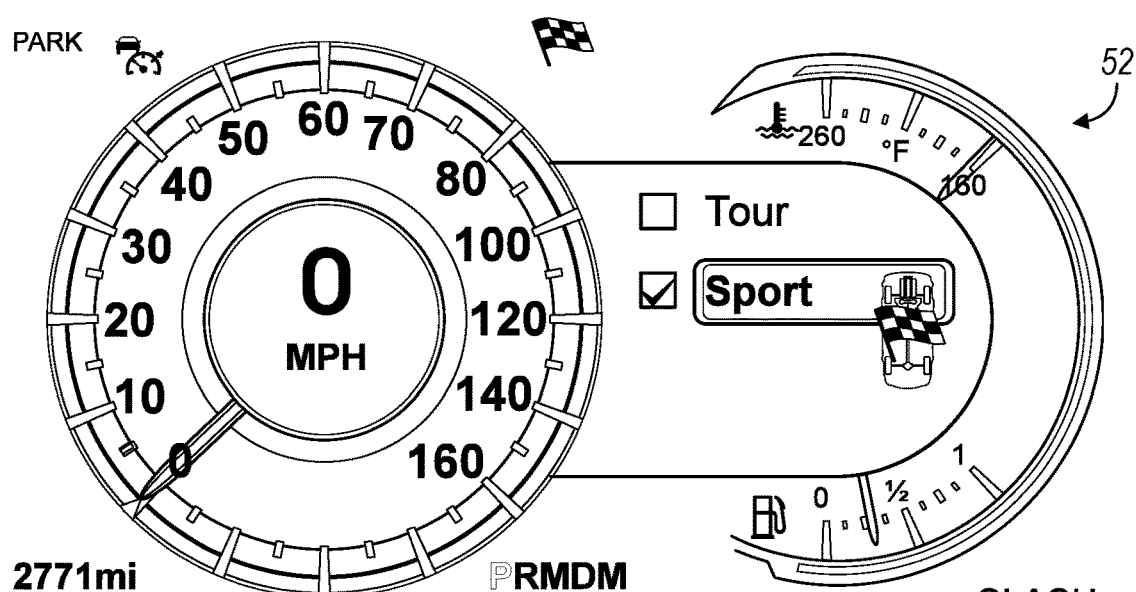
FIG. 2 is a vehicle interior display image according to an embodiment.

The controller 50 receives the adjustment settings from the pre-set data or from the customized data. The data may be input from one or more interfaces that is/are provided in the vehicle. The interface may be integrated into the vehicle, such as an instrument panel display 52 of FIG. 2 that is in suitable wired or wireless communication with the controller 50. The instrument panel display 52 of FIG. 2 permits an occupant to select a driving mode, for example, Tour or Sport. The display 52 may include a touchscreen for receiving input of the selection. Alternatively, a dedicated switch may permit the drive mode selection. The drive mode selection is communicated to the controller 50.

The interface may be remote, such as a personal digital assistant (PDA) including phones, tablets and the like. The interface may be provided as a smart device application, wherein users enter relevant information about themselves. The smart phone interface may not require on-site expertise or seat properties. The remote interface permits a user to transport settings to each vehicle, such as personal passenger vehicles, airline seating, rental cars, and the like.

Misalignments of spinal vertebrae and discs may cause irritation to the nervous system and may be an underlying cause to many health problems. Additionally, spinal misalignments can be a contributing factor to a herniated disc, a bulging disc, a facet joint problem, osteoarthritis and spinal stenosis. Sequential adjustment of a seat assembly can enhance posture to minimize spinal misalignments.

FIGS. 3-11 illustrate display images from an interface, such as a tablet. FIG. 3 illustrates a welcome screen wherein a data collection process is initiated. FIGS. 4 and 5 illustrate input screens wherein biometric, personal health and personal preference data, such as height and wellness, is collected. This data is utilized to adjust the seat to the pre-set options, based on the prior-collected data in the knowledge base or table.

Each of the air bladders 28, 32, 39, 40 may include a pressure sensor to detect air pressure in the respective bladder 28, 32, 39, 40. Any pressure sensor is contemplated, such as a pneumatic pressure sensor at the outlet valve of each respective air bladder 28, 32, 39, 40. Pressure can also be sensed by contact pressure sensors disposed in front of or behind some, or all of, the respective air bladders 28, 32, 39, 40, including on a front or rear surface thereof. The contact pressure sensors may include pressure-sensing mats, such as those available by Tekscan®, Inc. of 307 West First Street. South Boston, Mass. 02127-1309, USA.

Figure 6:
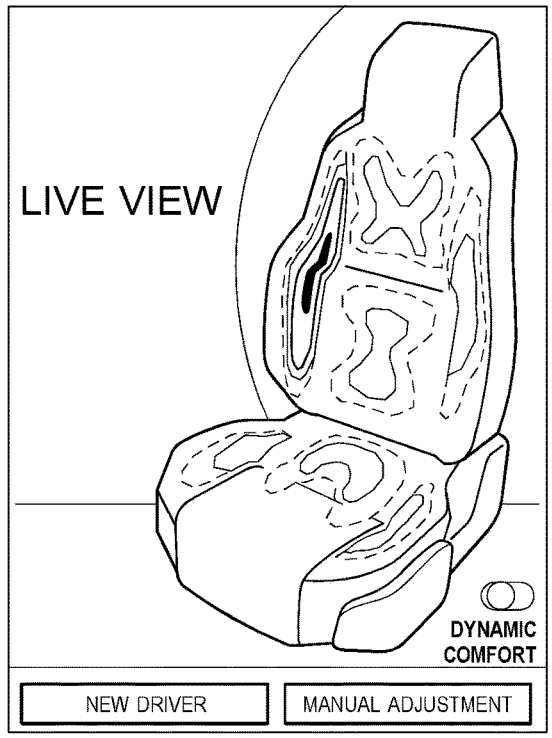
FIG. 6 is another display image for the vehicle seating system of FIG. 3.
Figure 7:
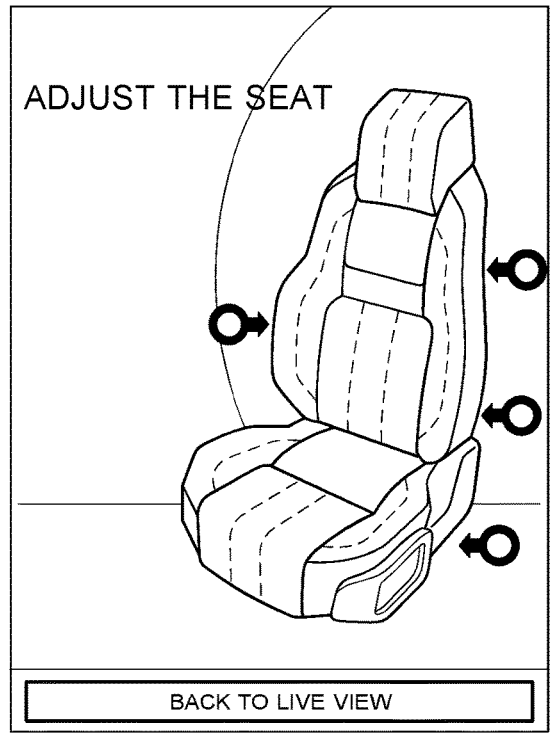
FIG. 7 is another display image for the vehicle seating system of FIG. 3.
Figure 8:
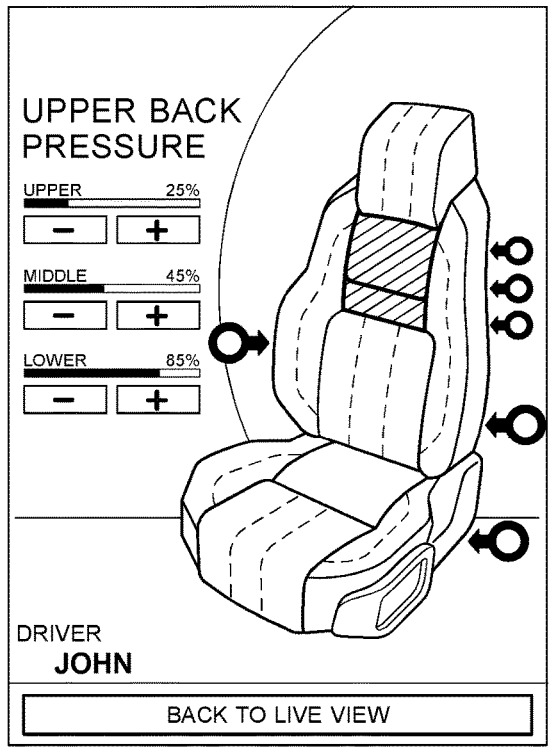
FIG. 8 is another display image for the vehicle seating system of FIG. 3.
Figure 9:
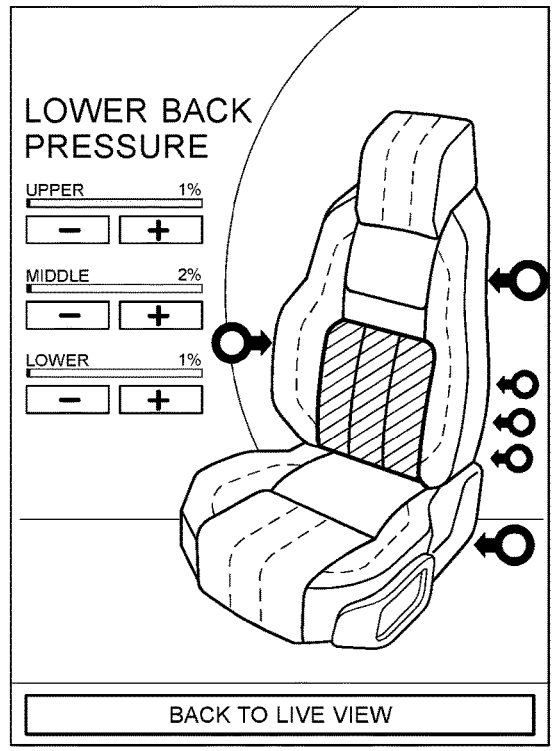
FIG. 9 is another display image for the vehicle seating system of FIG. 3.
Figure 10:
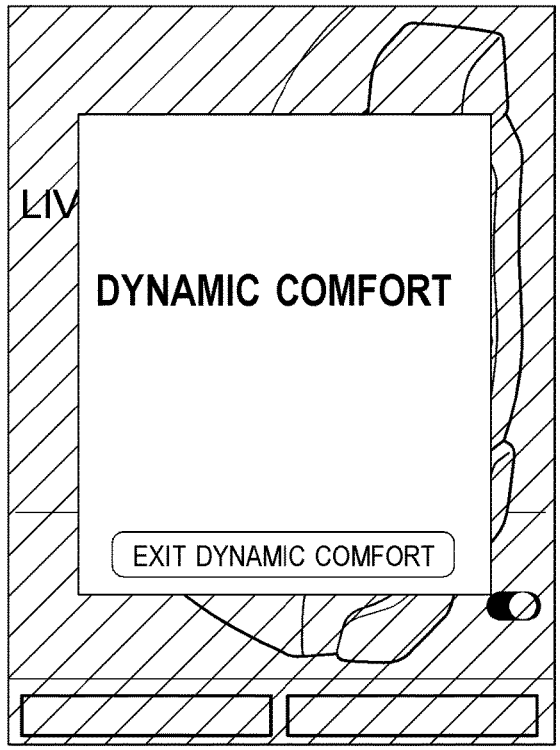
FIG. 10 is another display image for the vehicle seating system of FIG. 3.

FIG. 6 illustrates a depiction of the vehicle seat assembly 20 with zones ranging in color to depict a distribution of pressure upon the seat assembly 20. This visualization may assist an occupant in positioning upon the seat assembly 20 with live visual feedback. If manual adjustment is selected, FIG. 7 requests the occupant to select a zone of the seat assembly 20 for adjustment. Once a zone is selected, such as thoracic in FIG. 8 or lumbar in FIG. 9, incremental adjustment of each air bladder of the air bladder assembly 39 by the occupant is permitted.

A dynamic comfort, posture and wellness option is offered. Selection of the dynamic comfort option measures the pressure in the sensors at FIG. 10, and displays a live view as in FIG. 11. The controller 50 compares the sensor values, and if the controller 50 determines that the occupant is not seated evenly, the controller 50 balances the air pressure in opposing air bladders to balance the occupant seating position.

Figure 12:
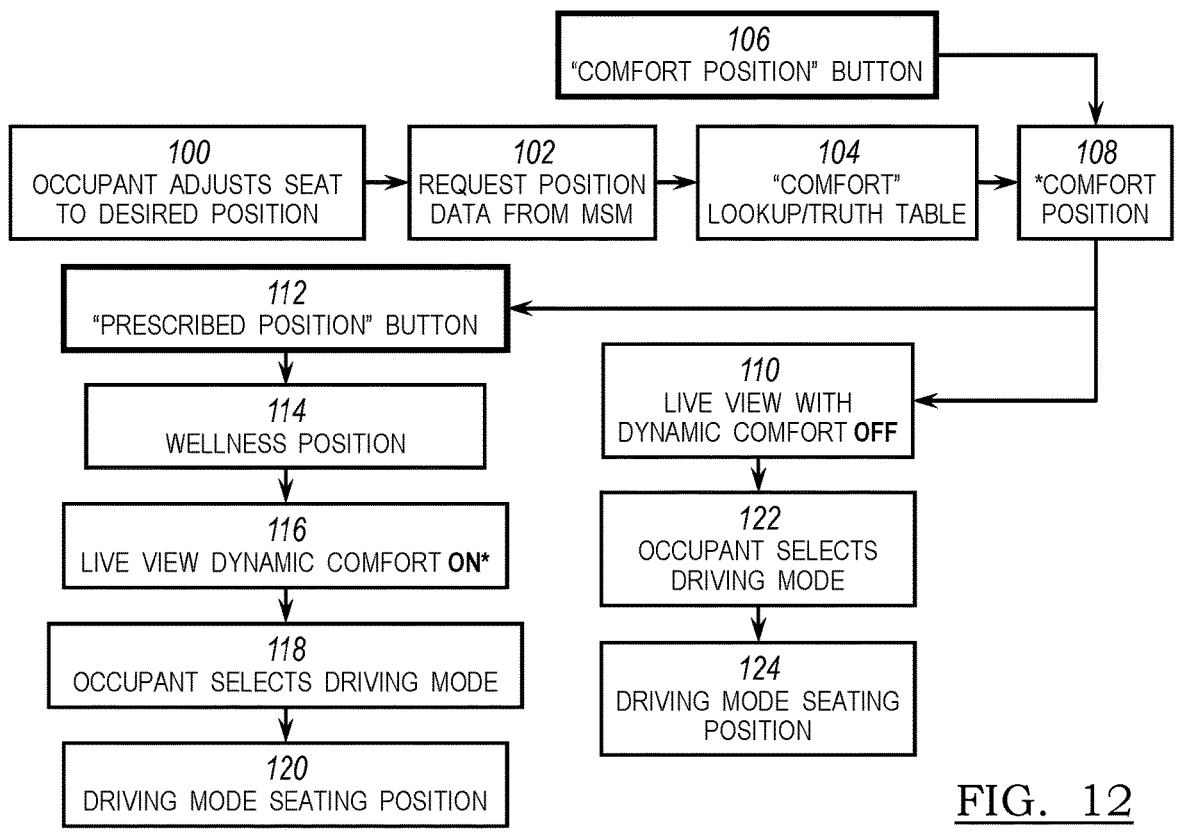
FIG. 12 is a flowchart of a portion of an overall method for adjusting a vehicle seat assembly according to an embodiment.

FIG. 12 depicts a flowchart for a method for adjusting the seat assembly 20 according to an embodiment. At block 100, the occupant adjusts the seat assembly 20 to a desired position. At block 102, position data is requested from a multicontour seat module to determine a manually adjusted position of the seat assembly 20. In block 104, the manually adjusted position is compared to a plurality of stored predetermined data ranges with corresponding preset seating positions to determine a preset seating position corresponding to the manually adjusted position, and to assign the associated preset seating position or "comfort position" to the manually adjusted position.

At block 108, the seat assembly 20 is adjusted to the comfort position or associated preset seating position. The comfort position is obtained in a comfort mode, as selected by a "comfort position" button at block 106. The "comfort position" button may be selected by default to obtain the comfort position. At block 110, a live view, such as FIG. 6 is generated and displayed.

According to an alternative embodiment, a collection of individuals were surveyed for comfort preferences and the data is tabulated into comfort seating positions for ranges of anthropometry data. The data received in the questionnaire in FIGS. 4 and 5 may be compared with the predetermined anthropometry data ranges, and the seat assembly 20 may be adjusted to a comfort position associated with the corresponding anthropometry data ranges.

Figure 11:
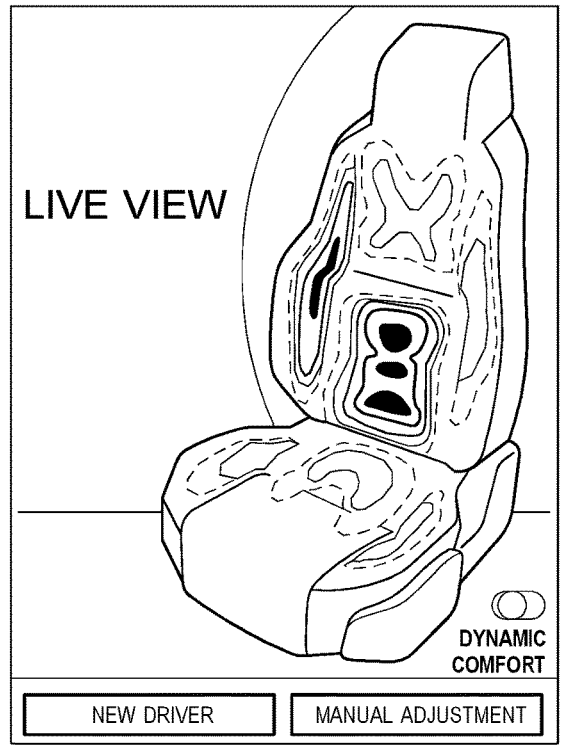
FIG. 11 is another display image for the vehicle seating system of FIG. 3.

Referring again to FIG. 12, upon occupant selection of a "prescribed position" button at block 112, a wellness mode of the seat assembly 20 is obtained. At block 114, the data received in the questionnaire of FIGS. 4 and 5 is compared with predetermined anthropometry data ranges. A table of predetermined wellness positions is prescribed by a health professional for optimal posture and wellness of various anthropometry ranges and stored in the controller. A prescribed wellness position is selected associated with the corresponding anthropometry data range for the data received by the occupant. At block 114, the seat assembly 20 is adjusted to the wellness position. Then, at block 116, a live view, such as FIG. 11 is displayed. A dynamic comfort mode may be on at this stage, as selected at button 112.

At block 118, the occupant selects a driving mode, which may be based on the occupant's preference or based upon current road and/or driving conditions. The seat assembly 20 will adjust to the selected driving mode to optimize seat performance and overall driving feel. The driving mode selection is made at the display screen 52 of FIG. 2. If a tour mode or a touring mode is selected, the seat assembly 20 is maintained in the wellness position.

If the sport driving mode is selected at block 118, then the controller 50 adjusts the seat assembly 20 to predetermined settings based on the sport driving mode at block 120. One example of the adjustments at block 120 result in a sport seating position with increased bolster and reduced recline. Referring again to FIG. 1, each of the side bolster air bladder assemblies 32, 40 has a range of inflation. In response to selection of the sport driving mode at block 118, the controller 50 increases the inflation of each of the side bolster air bladder assemblies 32, 40 to increase lateral or side bolster support to the occupant. The increase in pressure may be, for example, seventy-five percent of the max range of inflation. A typical air bladder assembly has a maximum inflation measure in pressure of thirty-four to thirty-five kilopascals (kPa), and the increase is seventy-five percent of the maximum pressure.

With continued reference to FIG. 1, the recline actuator 38 has a pivotal range of the seat back 36 relative to the seat cushion 22. In response to selection of the sport driving mode at block 118, the controller 50 decreases an angle between the seat back 36 and the seat cushion 22 to increase back support with a more upright seating position. The decreased angle or decreased decline, said another way—increased incline, may be five percent of the pivotal range, for example.

According to another embodiment, a performance driving mode may be offered at block 118 of FIG. 12 for sports cars and race cars. If the performance driving mode is selected at block 118, then the controller 50 adjusts the seat assembly 20 to predetermined settings based on the performance driving mode at block 120 to a performance driving position. The performance driving position may include increased bolster support, decreased central back support, reduced recline for increased back support, and increased thigh support. Referring again to FIG. 1, in response to selection of the performance driving mode at block 118, the controller 50 increases the inflation of each of the side bolster air bladder assemblies 32, 40 to increase lateral or side bolster support to the occupant. The increase in pressure may be, for example, ninety-five percent of the max range of inflation.

With continued reference to FIG. 1, in response to selection of the performance driving mode at block 118, the controller 50 decreases an angle between the seat back 36 and the seat cushion 22 to increase back support with a more upright seating position. The decreased angle may be five percent of the pivotal range, for example.

With the selection of the performance driving mode at block 118, the controller 50 also deflates the central air bladder assembly 39. The deflation may be full deflation, such as zero or minimal kPa. This deflation permits the occupant to be received deeper within the seating surface for enhanced lateral support from the side bolster air bladder assemblies 40. Thus, the occupant sits more upright, while further received or sunk into the seat back 36.

The performance driving mode selection also increases thigh support by adjusting the tilt actuator 26 to decrease tilt by pivoting a front of the seat cushion 22 upward. The tilt actuator 26 has a pivotal range of adjustment of the seat cushion 22 relative to the vehicle floor 24. At block 120, as the seat assembly 20 is adjusted to the performance seating position, the tilt actuator 26 is adjusted by ten percent of the pivotal range to decrease tilt by increasing the front of the seat cushion 22 and thereby increasing thigh support.

Referring again to FIG. 12, the selected driving modes may adjust the seat assembly 20 from the comfort position 108 also. At block 122, if the occupant selects the touring mode, then the comfort position from block 108 is maintained. If the occupant selects the sport driving mode or the performance driving mode, then the adjustments described with reference to block 120 are made at block 124.

Figure 13:
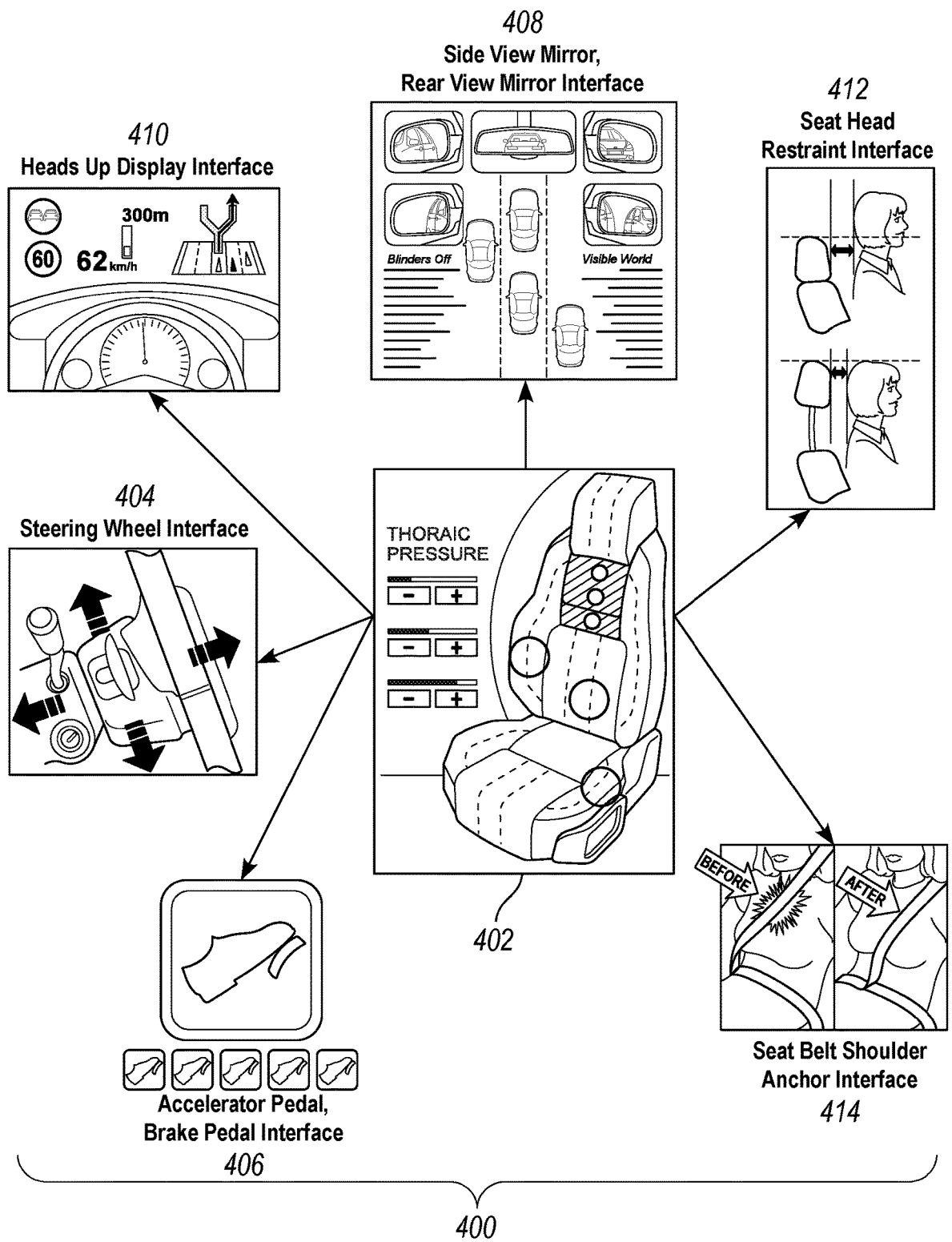
FIG. 13 is a system diagram of a vehicle assembly according to an embodiment.

With reference now to FIG. 13, once the seat assembly 20 and associated controls are activated to place an occupant in a proper seated posture, adjustments can be made to various power controlled interior components of a vehicle assembly to adapt to the seated postural change and driving mode. All of these interior components interface with the occupant and can be affected by changes in occupant position. For illustration purposes, a display 402 is illustrated in FIG. 13. The display 402 communicates with the seat controller 50 as described above. A vehicle controller can communicate with the seat controller 50 via a computer network to the various interior components of the vehicle assembly 400 to adjust the various interior components via software to accommodate the occupant position. The occupant input and position information can then be used to adjust the interior features mentioned above. The adjustment of the seat assembly 20 may be simultaneous during, or otherwise concurrent with, the adjustments of the various interior components of the vehicle assembly 400. The adjustment of the various interior components of the vehicle assembly 400 may be in response to the adjustment of the seat assembly 20. Alternatively, the seat assembly 20 and the various interior components of the vehicle assembly 400 may be adjusted in a sequence.

According to one example, the controller 50 may communicate with a steering wheel interface 404. After the seat assembly 20 is adjusted, a steering wheel assembly may be adjusted, such as tilt adjustment, extension/retraction adjustment, and/or raise/lower adjustment. The steering wheel adjustments may be prescribed by a health professional. Alternatively, the steering wheel adjustments may be determined based upon a detected occupant position. The steering wheel interface 404 may communicate with the controller 50 to report manual adjustments of the steering wheel to store the positions for a particular occupant.

The controller 50 may communicate with other vehicle drive control manual input devices, such as an accelerator pedal and brake pedal interface 406. After the seat assembly 20 is adjusted, one or more of the foot pedals may be adjusted, such as an accelerator pedal and a brake pedal. The pedal adjustments may be prescribed, or determined based upon a detected occupant position. The pedal interface 406 may communicate with the controller 50 to report manual adjustments of the pedals to store the positions for a particular occupant.

Vehicle vision devices may also communicate with the controller 50, such as a side view mirror and rear view mirror interface 408. After the seat assembly 20 is adjusted, one or more of the mirror assemblies may be adjusted, which include left and right side view mirrors and a rearview mirror. The mirror adjustments may be prescribed, or determined based upon a detected occupant position. The mirror interface 408 may communicate with the controller 50 to report manual adjustments of the mirrors to store the positions for a particular occupant.

The controller 50 may also communicate with a heads-up display interface 410. The heads-up display includes a projector for projecting information onto a portion of the windshield of the vehicle assembly 400. The adjustment may include orientation and focus prescribed for a particular user. After the seat assembly 20 is adjusted, the display may be adjusted. The adjustments may be determined from a detected occupant position. The heads-up display interface 410 may communicate with the controller 50 to report manual adjustments of the display to store the adjustment data for a particular occupant.

Safety restraints may also communicate with the controller 50, such as a seat head restraint interface 412. After the seat assembly 20 is adjusted, the head restraint may be extended forward and upward to minimize a gap between the head restraint and a head of an occupant. The head restraint adjustments may be prescribed, or determined from a detected occupant position. The seat head restraint interface 412 may communicate with the controller 50 to report manual adjustments of the head restraint to store the positions for a particular occupant. Alternatively, the seat head restraint interface 412 may be incorporated into the controller 50.

A seat belt shoulder anchor interface 414 is also depicted in communication with the seat assembly controller 50. The seat belt shoulder anchor may be affixed to a vehicle body pillar, or the seat assembly 20. After the seat assembly 20 is adjusted, the seat belt shoulder anchor may be translated to an optimal comfort, wellness or safety position. The seat belt shoulder anchor adjustments may be prescribed, or determined from a detected occupant position. The seat belt shoulder anchor interface 414 may communicate with the controller 50 to report manual adjustments of the seat belt shoulder anchor to store the positions for a particular occupant. Alternatively, the seat belt shoulder anchor interface 414 may be incorporated into the controller 50.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat cushion adapted to be adjustably mounted to a vehicle body;
   a seat back pivotally mounted adjacent the seat cushion;
   at least one actuator operably connected to at least one of the seat cushion and the seat back for adjustment of at least one of a plurality of settings of the seat assembly; and
   a controller in electrical communication with the at least one actuator and programmed to:

receive a data input indicative of occupant anthropometry data, compare the data input with predetermined data ranges, adjust at least one of the plurality of settings of the at least one actuator to a predetermined setting based on the predetermined data range, receive a data input indicative of a selected driving mode, adjust at least one of the plurality of settings of the at least one actuator to another predetermined setting based on the selected driving mode, and adjust at least one of the plurality of settings of the at least one actuator in response to the selected driving mode to decrease central back support.

2. The seat assembly of claim 1 wherein the controller is further programmed to adjust at least one of the plurality of settings of the at least one actuator in response to the selected driving mode to increase bolster support.

3. The seat assembly of claim 2 wherein the at least one actuator is oriented within a side bolster region of the seat assembly.

4. The seat assembly of claim 2 wherein the at least one actuator comprises:
a pair of side bolster actuators oriented within side bolster regions of the seat cushion; and
a pair of side bolster actuators oriented within side bolster regions of the seat back.

5. The seat assembly of claim 2 wherein the at least one actuator has a range of adjustment; and
wherein the controller is further programmed to adjust the at least one actuator to at least seventy-five percent of the range of adjustment in response to the selected driving mode to increase bolster support.

6. The seat assembly of claim 2 wherein the at least one actuator comprises:
an inflation device in electrical communication with the controller; and
at least one air bladder with a range of inflation in fluid communication with inflation device; and
wherein the controller is further programmed to adjust the inflation device so that the at least one air bladder is at seventy-five percent inflation in response to the selected driving mode to increase bolster support.

7. The seat assembly of claim 2 wherein the at least one actuator has a range of adjustment; and
wherein the controller is further programmed to adjust the at least one actuator to at least ninety-five percent of the range of adjustment in response to the selected driving mode to increase bolster support.

8. The seat assembly of claim 2 wherein the at least one actuator comprises:
an inflation device in electrical communication with the controller; and
at least one air bladder with a range of inflation in fluid communication with the inflation device; and
wherein the controller is further programmed to adjust the inflation device so that the at least one air bladder is at ninety-five percent inflation in response to the selected driving mode to increase bolster support.

9. The seat assembly of claim 1 wherein the at least one actuator comprises a seat back recline actuator.

10. The seat assembly of claim 9 wherein the seat back has a pivot range relative to the seat cushion; and
wherein the controller is further programmed to decrease an angle between the seat cushion and the seat back in response to the selected driving mode to increase back support.

11. The seat assembly of claim 10 wherein the controller is further programmed to decrease the angle between the seat cushion and the seat back by five percent in response to the selected driving mode to increase back support.

12. The seat assembly of claim 1 wherein the controller is further programmed to adjust at least one of the plurality of settings of the at least one actuator in response to the selected driving mode to increase thigh support.

13. The seat assembly of claim 12 wherein the seat cushion is adapted to be pivotally mounted to the vehicle body with a pivotal range to adjust a tilt angle of the seat cushion; and
wherein the controller is further programmed to adjust the at least one actuator to raise a front of the seat cushion in response to the selected driving mode to increase thigh support.

14. The seat assembly of claim 13 wherein the controller is further programmed to adjust the at least one actuator to raise the front of the seat cushion by ten percent of the pivotal range in response to the selected driving mode to increase thigh support.

15. The seat assembly of claim 1 wherein the at least one actuator is oriented within a central back region of the seat back.

16. The seat assembly of claim 15 wherein the at least one actuator comprises:
an inflation device in electrical communication with the controller; and
at least one air bladder oriented centrally within the seat back in fluid communication with the inflation device.

17. The seat assembly of claim 16 wherein the controller is further programmed to adjust the inflation device so that the at least one air bladder is deflated in response to the selected driving mode to decrease central back support.

18. The seat assembly of claim 1 further comprising:
an inflation device;
a pair of side bolster air bladders in fluid communication with the inflation device and oriented within side bolster regions of the seat cushion, each with a range of inflation;
wherein the seat back is pivotally mounted adjacent the seat cushion with a pivot range;
a seat back recline actuator operably connected to the seat cushion and the seat back to adjust a recline angle of the seat back relative to the seat cushion; and
a pair of side bolster air bladders in fluid communication with the inflation device and oriented within side bolster regions of the seat back; and
wherein the controller is in electrical communication with the inflation device and the seat back recline actuator, and the controller is further programmed to:
receive a data input indicative of a sport driving mode,
adjust the inflation device to inflate the pair of side bolster air bladders in the seat cushion to increase bolster support in response to the sport driving mode,
adjust the inflation device to inflate the pair of side bolster air bladders in the seat back to increase bolster support in response to the sport driving mode, and
adjust the seat back recline actuator to decrease an angle between the seat cushion and the seat back in response to the sport driving mode to increase back support.

19. A seat assembly comprising:
a seat cushion adapted to be adjustably mounted to a vehicle body;
a seat back pivotally mounted adjacent the seat cushion;

at least one actuator operably connected to at least one of the seat cushion and the seat back for adjustment of at least one of a plurality of settings of the seat assembly;

wherein the at least one actuator has a range of adjustment; and a controller in electrical communication with the at least one actuator and programmed to:
- receive a data input indicative of occupant anthropometry data,
- compare the data input with predetermined data ranges,
- adjust at least one of the plurality of settings of the at least one actuator to a predetermined setting based on the predetermined data range,
- receive a data input indicative of a selected driving mode,
- adjust at least one of the plurality of settings of the at least one actuator to another predetermined setting based on the selected driving mode,
- adjust at least one of the plurality of settings of the at least one actuator in response to the selected driving mode to increase bolster support, and
- adjust the at least one actuator to at least seventy-five percent of the range of adjustment in response to the selected driving mode to increase bolster support.

20. A seat assembly comprising:

a seat cushion adapted to be adjustably mounted to a vehicle body;

a seat back pivotally mounted adjacent the seat cushion;

at least one actuator operably connected to at least one of the seat cushion and the seat back for adjustment of at least one of a plurality of settings of the seat assembly;

wherein the at least one actuator comprises a seat back recline actuator;

wherein the seat back has a pivot range relative to the seat cushion; and a controller in electrical communication with the at least one actuator and programmed to:
- receive a data input indicative of occupant anthropometry data,
- compare the data input with predetermined data ranges,
- adjust at least one of the plurality of settings of the at least one actuator to a predetermined setting based on the predetermined data range,
- receive a data input indicative of a selected driving mode,
- adjust at least one of the plurality of settings of the at least one actuator to another predetermined setting based on the selected driving mode,
- decrease an angle between the seat cushion and the seat back in response to the selected driving mode to increase back support, and
- decrease the angle between the seat cushion and the seat back by five percent in response to the selected driving mode to increase back support.

* * * * *